US009238215B2

(12) United States Patent
Weismantel et al.

(10) Patent No.: US 9,238,215 B2
(45) Date of Patent: Jan. 19, 2016

(54) APPARATUS FOR THE PRODUCTION OF WATER ABSORBING POLYMERS

(71) Applicant: BASF SE, Ludwigshafen (DE)

(72) Inventors: Matthias Weismantel, Jossgrund-Oberndorf (DE); Stefan Bruhns, Hellerup (DK); Dominicus van Esbroeck, Nanjing (CN)

(73) Assignee: BASF SE, Ludwigshafen (DE)

( * ) Notice: Subject to any disclaimer, the term of this patent is extended or adjusted under 35 U.S.C. 154(b) by 247 days.

(21) Appl. No.: 14/063,129

(22) Filed: Oct. 25, 2013

(65) Prior Publication Data

US 2014/0047730 A1 Feb. 20, 2014

Related U.S. Application Data

(62) Division of application No. 11/816,769, filed as application No. PCT/EP2006/061010 on Mar. 23, 2006, now Pat. No. 8,592,516.

(30) Foreign Application Priority Data

Mar. 24, 2005 (DE) .......................... 10 2005 014 291

(51) Int. Cl.
*F26B 5/08* (2006.01)
*B01J 20/30* (2006.01)
*C08F 6/00* (2006.01)
*C08F 6/10* (2006.01)
*F26B 17/04* (2006.01)
*F26B 21/06* (2006.01)

(52) U.S. Cl.
CPC ................. *B01J 20/30* (2013.01); *C08F 6/008* (2013.01); *C08F 6/10* (2013.01); *F26B 17/04* (2013.01); *F26B 21/06* (2013.01)

(58) Field of Classification Search
CPC ................. F26B 3/00; F26B 5/00; F26B 5/08; F26B 7/00; A23L 3/00; A23L 3/16; B32B 5/00; B32B 5/16; B65G 47/02; B65G 47/19
USPC ............ 34/459, 481, 489, 496; 426/233, 455, 426/511; 428/323; 528/502 R, 484
See application file for complete search history.

(56) References Cited

U.S. PATENT DOCUMENTS

| | | | |
|---|---|---|---|
| 3,765,103 A | 10/1973 | Miles | |
| 5,229,487 A | 7/1993 | Tsubakimoto et al. | |
| 5,380,808 A | 1/1995 | Sumiya et al. | |
| 5,659,975 A * | 8/1997 | Bahner | F26B 3/283 34/459 |
| 5,901,462 A * | 5/1999 | Rudd | F26B 13/14 34/122 |
| 6,058,623 A * | 5/2000 | Brooks | B01D 1/10 34/134 |
| 6,174,978 B1 | 1/2001 | Hatsuda et al. | |
| 7,003,896 B2 * | 2/2006 | Tafel | F26B 13/10 101/351.1 |
| 7,259,212 B2 | 8/2007 | Popp et al. | |
| 8,161,661 B2 * | 4/2012 | Bartol | F26B 17/1483 110/235 |
| 8,592,516 B2 * | 11/2013 | Weismantel | C08F 6/008 34/384 |
| 2003/0218058 A1 * | 11/2003 | Shaw | B23K 1/012 228/230 |
| 2004/0183235 A1 | 9/2004 | Dairoku et al. | |
| 2006/0177647 A1 | 8/2006 | Schmidt et al. | |
| 2008/0009616 A1 | 1/2008 | Frank et al. | |
| 2008/0214749 A1 * | 9/2008 | Weismantel | C08F 6/008 526/73 |
| 2008/0227933 A1 | 9/2008 | Funk et al. | |
| 2008/0275195 A1 | 11/2008 | Weismantel et al. | |
| 2009/0047613 A1 * | 2/2009 | Demler | C04B 2/005 432/17 |
| 2011/0125119 A1 * | 5/2011 | Weismantel | A61F 13/537 604/372 |
| 2011/0130275 A1 * | 6/2011 | Weismantel | A61F 13/15203 502/402 |
| 2011/0130735 A1 * | 6/2011 | Weismantel | A61F 13/15203 604/372 |
| 2011/0214593 A1 * | 9/2011 | Roychoudhury | F23J 15/04 110/345 |
| 2012/0101459 A1 * | 4/2012 | Meyer | A61L 15/22 604/372 |
| 2013/0207037 A1 * | 8/2013 | Daniel | C08J 3/12 252/194 |
| 2014/0047730 A1 * | 2/2014 | Weismantel | C08F 6/008 34/236 |

FOREIGN PATENT DOCUMENTS

| | | | | |
|---|---|---|---|---|
| DE | 1 95 117 69 A1 | 10/1995 | | |
| DE | 102007053030 A1 * | 5/2009 | | D04H 1/49 |
| DE | 102008063661 A1 * | 6/2010 | | C02F 11/12 |
| EP | 0 205 674 A1 | 12/1986 | | |
| EP | 0 289 338 A2 | 11/1988 | | |
| EP | 0 948 997 A2 | 10/1999 | | |

(Continued)

OTHER PUBLICATIONS

Buchholz and Graham, "Modern Superabsorbent Polymer Technology," Wiley-VCH, pp. 72-93 and 142-144 (1998).

(Continued)

*Primary Examiner* — Stephen M Gravini
(74) *Attorney, Agent, or Firm* — Marshall, Gerstein & Borun LLP

(57) ABSTRACT

An apparatus for producing a water-absorbing polymer by polymerizing a monomer solution and drying the resulting hydrogel by means of a heated gas stream through effecting the drying in two or more temperature zones. A gas stream is flowed against the hydrogel upwardly in the upstream sector of the belt dryer and downwardly in the downstream sector of the belt dryer, the direction of flow being reversed at a water content of 15% to 45% by weight for the hydrogel. The hydrogel layer is flowed against in a belt dryer upwardly to some extent at least, the gas velocity being 5% to 30% of the gas velocity required to lift the hydrogel off the belt, to produce hygiene articles.

6 Claims, No Drawings

(56) References Cited

FOREIGN PATENT DOCUMENTS

| | | | |
|---|---|---|---|
| EP | 1 130 045 A2 | 9/2001 | |
| EP | 1 002 806 B1 | 3/2005 | |
| GB | 1285457 A * | 8/1972 | ............... B27N 5/02 |
| JP | 08-073518 A | 3/1996 | |
| JP | 4297756 B2 * | 7/2009 | |
| WO | WO-03/104302 | 12/2003 | |
| WO | WO-2004/096303 A2 | 11/2004 | |
| WO | WO-2004/096304 A1 | 11/2004 | |
| WO | WO-2005/103119 A1 | 11/2005 | |
| WO | WO-2005/123781 | 12/2005 | |

OTHER PUBLICATIONS

Buchholz and Graham, "Modern Superabsorbent Polymer Technology," Wiley-VCH, pp. 87-93 (1998).
"Chemical Industry (supplementary volume)", pp. 58-80 (1984).
"EDANA Recommended Test Methods," pp. 1, 2, 5, 7, 8, 303-309 (2002).
"EDANA Recommended Test Methods," pp. 1, 2, 5, 7, 8, 333-339 (2002).
Hanyu, "Chemical Equipment", pp. 98-99 (1998).
International Search Report in PCT/EP2006/061010 dated Jul. 7, 2006.
Ullmann's Encyclopedia of Industrial Chemistry, 6 ed., vol. 35, pp. 73-103.

* cited by examiner

APPARATUS FOR THE PRODUCTION OF WATER ABSORBING POLYMERS

CROSS-REFERENCE TO RELATED APPLICATIONS

This is a divisional of U.S. patent application Ser. No. 11/816,769, filed Aug. 21, 2007, now U.S. Pat. No. 8,592, 516, which is the U.S. national phase application of International Application No. PCT/EP2006/061010, filed Mar. 23, 2006, which claims the benefit of German patent application No. 10 2005 014 291.5, filed Mar. 24, 2005.

The present invention relates to a process for producing water-absorbing polymers having a low Drying Quality Index by polymerizing a monomer solution and drying the resulting hydrogel by means of a heated gas stream, to apparatus for carrying out the process and to the use of the water-absorbing polymers produced by the process to produce hygiene articles.

Further embodiments of the present invention are discernible from the claims, the description and the examples. It will be appreciated that the hereinbefore identified and the hereinafter still to be more particularly described features of the subject matter of the present invention are utilizable not only in the particular combination indicated but also in other combinations without leaving the realm of the present invention.

Water-absorbing polymers are in particular polymers of (co)polymerized hydrophilic monomers, graft (co)polymers of one or more hydrophilic monomers on a suitable grafting base, crosslinked ethers of cellulose or of starch, crosslinked carboxymethylcellulose, partially crosslinked polyalkylene oxide or natural products that are swellable in aqueous fluids, such as guar derivatives for example. Such polymers are used as products capable of absorbing aqueous solutions to manufacture diapers, tampons, sanitary napkins and other hygiene articles, but also as water-retaining agents in market gardening.

The production of water-absorbing polymers is described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, volume 35, pages 73 to 103.

The polymerization typically affords an aqueous polymeric gel which has to be dried. The drying of the polymeric gel is likewise disclosed in the monograph "Modern Superabsorbent Polymer Technology", F. L. Buchholz and A. T. Graham, Wiley-VCH, 1998, pages 87 to 93.

Drying processes all share the trait that, owing to the broad gel size distribution of the polymeric material to be dried, complete drying of all hydrogel particles is effected only under conditions under which the major part of the hydrogen particles is already overdried. These drying conditions constitute an uneconomical utilization of dryer capacity. However, when utilization of dryer capacity is economically optimized, the drying conditions are such that the major part of the hydrogel particles is already dry while a minor part of the hydrogel particles is still moist. Moist particles of hydrogel are rubberally elastic and tend to stick together, so that they lead to appreciable disruptions in the subsequent grinding and sieving operation undergone by the material to be dried which are undesirable. The moist, rubberally elastic particles of hydrogel accordingly have to be separated from the brittle, partly overdried hydrogel particles prior to grinding. Commercial operators therefore choose drying conditions which constitute a comprise between dryer capacity utilization and processibility of dryer feedstock.

It is an object of the present invention to provide an improved process for producing water-absorbing polymeric particles, in particular improved drying of the aqueous polymeric gels which arise during the process.

The drying process should be economical and lead within short residence times to a product having a low water content, but the drying process should also be very gentle, so that product quality is only minimally altered by drying.

We have found that this object is achieved by a process for producing water-absorbing polymers by polymerizing a monomer solution and drying the resulting hydrogel by means of a heated gas stream, which comprises effecting the drying in two or more temperature zones for which the gas inlet temperatures satisfy the condition $T_n$ unequal $T_{n+a}$, where the indices n and a are each a whole number greater than 0, preferably a whole number from 1 to 20, more preferably a whole number from 1 to 10 and most preferably a whole number from 1 to 5, and/or the gas stream is flowed against the hydrogel upwardly in the upstream sector of a belt dryer and downwardly in the downstream sector of the belt dryer, the direction of flow being reversed at a water content of 15% to 45% by weight for the hydrogel, and/or the hydrogel layer is flowed against in a belt dryer upwardly to some extent at least, the gas velocity being 5% to 30% of the gas velocity required to lift the hydrogel off the belt.

The temperature of the heated gas stream is preferably not less than 50° C., more preferably not less than 100° C. and most preferably not less than 150° C. and preferably up to 250° C., more preferably up to 220° C. and most preferably up to 200° C.

The indices indicate the chronological order of the temperature zones which the dryer feedstock traverses in ascending order in that temperature zones having higher indices are traversed later. A temperature zone is a region in which the gas inlet temperature can be set independently.

The upstream sector consists of temperature zones having lower indices, while the downstream sector consists of temperature zones having higher indices. The dryer feedstock accordingly passes first through the upstream sector.

The water content is determined by EDANA (European Disposables and Nonwovens Association) recommended test method No. 430.2-02 "Moisture content".

The gas or air velocity at which the hydrogel layer lifts off the belt (fluidization point) can be determined experimentally or computed by $$Vmax = \sqrt{\frac{\rho_B \times g \times \Delta h}{c_D}}$$

where $v_{max}$ is the maximum gas or air velocity at which the hydrogel lifts off the belt, $\rho_B$ is the bulk density of the hydrogel, g is the gravitational constant, $\Delta h$ is the pressure drop through the hydrogel layer, and $c_D$ is the gas or air drag coefficient. At the fluidization point, the gravitational force and the gas or air drag which are acting on the hydrogel layer cancel each other out. The fluidization point marks the boundary between the fixed bed and the fluidized bed. The bulk density of the hydrogel is the ratio of the weight of the hydrogel on the belt to the bulk volume of the hydrogel on the belt. The bulk volume of the hydrogel, as well as the hydrogel, includes the voids in the hydrogel.

Preferably, the at least two gas inlet temperatures satisfy the condition of $T_n$ greater than $T_{n+a}$.

The drying is preferably effected in three or more temperature zones for which the gas inlet temperatures satisfy the conditions of $T_n$ unequal $T_{n+a}$, preferably $T_n$ greater than $T_{n+a}$ and $T_{n+a}$ less than $T_{n+b}$, where the index b is a whole number greater than a, preferably a whole number from (a+1) to (a+20), more preferably a whole number from (a+1) to (a+10) and most preferably a whole number from (a+1) to (a+5), and preferably $T_n$ greater than $T_{n+b}$.

In one particularly preferred embodiment of the present invention the gas inlet temperatures in two or more of the a temperatures zones $T_n$ to $T_{n+a-1}$ satisfy the condition $T_{n+r}$ greater than $T_{n+s}$, where the index a is a whole number greater than 1, the index r is a whole number from 0 to (a−2) and the index s is a whole number from (r+1) to (a−1).

In a further particularly preferred embodiment of the present invention, the gas inlet temperatures in two or more of the (c−b) temperature zones $T_{n+b}$ to $T_{n+c-1}$ satisfy the condition of $T_{n+u}$ greater than $T_{n+v}$, where the index c is a whole number greater than (b+1), preferably a whole number from (b+1) to (b+20), more preferably a whole number from (b+1) to (b+10) and most preferably a whole number from (b+1) to (b+5), the index u is a whole number from b to (c−2), and the index v is a whole number from (u+1) to (c−1).

In one very particularly preferred embodiment of the present invention, the gas inlet temperatures in three or more of the (c−b) temperature zones $T_{n+b}$ to $T_{n+c-1}$ satisfy the condition of $T_{n+u}$ greater than $T_{n+v}$ greater than $T_{n+w}$ where the index c is a whole number greater than (b+2), preferably a whole number from (b+2) to (b+20), more preferably a whole number from (b+2) to (b+10) and most preferably a whole number from (b+2) to (b+5), the index u is a whole number from b to (c−3), the index v is a whole number from (u+1) to (c−2) and the index w is a whole number from (v+1) to (c−1).

Very particular preference is given to a process for drying aqueous hydrogels in six or more temperature zones wherein a is not less than 2, b is not less than 3 and c is not less than 6. The gas inlet temperature settings are preferably such that $T_n$ greater than $T_{n+b}$, $T_{n+1}$ greater than $T_{n+b+1}$ and also $T_{n+1}$ not less than $T_{n+b}$.

The optimum and hence preferred temperature distribution can also be depicted as a wave consisting of two peaks and one trough. The first peak is $T_n$, the second peak is $T_{n+b}$ and the trough in between is $T_{n+a}$, the first peak being higher than the second.

The gas inlet temperatures, if at all, differ by typically not less than 0.5° C., preferably not less than 1° C., more preferably not less than 5° C. and most preferably not less than 10° C., and typically by up to 50° C., preferably by up to 40° C., more preferably by up to 30° C. and most preferably by up to 20° C.

The velocity of the gas stream flowing against the hydrogel layer is preferably not less than 0.5 m/s, more preferably not less than 0.8 m/s and most preferably not less than 1 m/s and preferably up to 5 m/s, more preferably up to 3 m/s and most preferably up to 2 m/s.

The gas to be used is not subject to any restrictions. The drying may utilize air, nitrogen or other gases which are inert under drying conditions. Air is preferred.

The gas stream flowing against the hydrogel may comprise water vapor. But the water vapor content should not exceed a value which corresponds to a dew point of preferably not more than 50° C., more preferably not more than 40° C. and most preferably not more than 30° C.

The gas inlet temperatures $T_n$ to $T_{n+a-1}$ are preferably not more than 200° C. and more preferably in the range from 175 to 180° C.

The gas inlet temperatures $T_{n+a}$ to $T_{n+b-1}$ are preferably not less than 150° C., more preferably not less than 155° C. and most preferably in the range from 155 to 160° C.

The gas inlet temperatures $T_{n+b}$ to $T_{n+c-1}$ are preferably not more than 185° C., more preferably not more than 180° C. and most preferably in the range from 170 to 175° C.

The drying residence time is preferably not less than 10 minutes, more preferably not less than 20 minutes and most preferably not less than 30 minutes and preferably up to 120 minutes, more preferably up to 90 minutes and most preferably up to 60 minutes.

The relative residence time is preferably not less than 10%, more preferably not less than 15% and preferably up to 25%, very particularly preferably up to 20% and very particularly preferably 18% for the sum total of the residence times of the temperature zones having the gas inlet temperatures $T_n$ to $T_{n+a-1}$, preferably not less than 5% and more preferably not less than 10% and preferably up to 20%, very particularly preferably up to 16% and very particularly preferably 14% for the sum total of the residence times of the temperatures zones having the gas inlet temperatures $T_{n+a}$ to $T_{n+b-1}$, and preferably not less than 80% and more preferably not less than 70% and preferably up to 40%, very particularly preferably up to 60% and very particularly preferably 68% for the sum total of the residence times of the temperature zones having the gas inlet temperatures $T_{n+b}$ to $T_{n+c-1}$, all based on the total residence time on the dryer.

The relative residence time in the a individual temperature zones $T_n$ to $T_{n+a-1}$ is preferably set such that the relative residence times are the same.

The relative residence time in the (b−a) individual temperature zones $T_{n+a}$ to $T_{n+b-1}$ is preferably set such that the relative residence times are the same.

The relative residence time in the (c−b) individual temperature zones $T_{n+b}$ to $T_{n+c-1}$ is preferably set such that the relative residence times are the same.

When the hydrogel to be dried is flowed against by the gas stream upwardly in the upstream sector of the belt dryer and downwardly in the downstream sector of the belt dryer, then the water content of the hydrogel at the reversal of the direction of flow is preferably not less than 20% by weight, more preferably not less than 24% by weight, even more preferably not less than 26% by weight and most preferably not less than 28% by weight and preferably not more than 40% by weight, more preferably not more than 34% by weight, even more preferably not more than 32% by weight and most preferably not more than 30% by weight. The drying is preferably operated such that the reversal of the direction of flow occurs between the temperature zones $T_{n+b-1}$ and $T_{n+b}$.

Preferably, the velocity of the gas stream is in an elevated state after the reversal of the direction of flow, elevated by preferably not less than 10%, more preferably by not less than 30% and very particularly by not less than 40% and preferably by up to 100%, more preferably up to 80% and very particularly by up to 60%.

When the belt dryer is flowed against upwardly to some extent at least, the gas velocity is preferably not less than 5%, more preferably not less than 8% and most preferably not less than 10% and preferably up to 30%, more preferably up to 25% and most preferably up to 20% of the gas velocity required to lift the hydrogel off the belt.

The water content of the polymer gel to be dried is preferably not less than 30% by weight, more preferably not less than 40% by weight and most preferably not less than 50% by weight and preferably up to 70% by weight, more preferably up to 65% by weight and most preferably up to 60% by weight.

The water content of the dried polymer gel is preferably not less than 2% by weight, more preferably not less than 3% by weight and most preferably not less than 5% by weight and preferably up to 10% by weight, more preferably up to 9% by weight and most preferably up to 8% by weight.

The drying is preferably effected at a pressure which is reduced, preferably by not less than 0.5 mbar, more preferably by not less than 2 mbar and most preferably by not less than 10 mbar, compared with the atmospheric pressure.

The reduced pressure in the dryer compared with the atmospheric pressure produces better gas flow in the dryer and hence more uniform drying.

The process preferred for the present invention is a conveyor belt process (belt dryer). A belt dryer is a convective system of drying, for the particularly gentle treatment of through-airable products. The product to be dried is placed onto an endless conveyor belt which lets gas through, and is subjected to the flow of a heated gas stream, preferably air.

The drying gas is recirculated in order that it may become very highly saturated in the course of repeated passage through the product layer. A certain fraction of the drying gas, preferably not less than 10%, more preferably not less than 15% and most preferably not less than 20% and preferably up to 50%, more preferably up to 40% and most preferably up to 30% of the gas quantity per pass, leaves the dryer as a highly saturated vapor and carries off the water quantity evaporated from the product.

The size and design of the dryers depends on the product to be processed, the manufacturing capacity and the drying duty.

A belt dryer can be embodied as a single-belt, multibelt, multistage or multistory system. The present invention is preferably practiced using a belt dryer having at least one belt. One-belt dryers are very particularly preferred. To ensure optimum performance of the belt-drying operation, the drying properties of the water-absorbing polymers are individually determined as a function of the processing parameters chosen. The hole size and mesh size of the belt is conformed to the product. Similarly, certain surface enhancements, such as electropolishing or Teflonizing, are possible.

Any chain-guided or chainless belt system known to one skilled in the art can be used to ensure optimum conveying of product, examples being plate belts, thin sheet metal and endless plate belts, polymeric and metallic fabric belts.

To ensure economical drying of the water-absorbing polymers, the gas routing in the dryer is consistently designed for energy-efficient operation. Various gas-routing concepts are possible which have advantages with regard to drying characteristics and energy utilization. Energy-recovering systems can be used to utilize heat from the offgas stream to preheat the supplied fresh gas.

The gas routing can be in accordance with the following concepts: in crossflow downwardly/upwardly/alternatingly, cross countercurrent or else in cross cocurrent. Gas routing in cross countercurrent is preferred.

The dryer can be heated directly or indirectly via the various heating media such as steam, warm water, combustion gases, thermal oil or gas.

The one-belt dryer is notable for a low installed height. It is used for gentle drying and when poured transfers of loose material from one belt to another are not possible or desired.

When space is tight and drying times are very long, the concept of a multibelt dryer is frequently commendable. The product is uniformly distributed onto the uppermost belt and is forwarded in succession to a plurality of belts underneath. This has the advantage that the product transitioning and falling onto the next plane is repeatedly turned and homogenized. The poured transfer of the product in the course of transitioning from one belt to the next leads to the breakup of agglomerates and to the creation of new free surfaces for heat and mass transfer.

Multistory dryers have similar features to multibelt dryers, but the individual sections are independently controllable like one-belt dryers. A multistage dryer consists of a plurality of successive connected one-belt dryers.

A uniform product feed is an essential prerequisite for optimal drying. Uniform product feed can be achieved through the use of swivelable and oscillating distributing belts, swing chutes or screws, vibration chutes or swing conveyors.

The hydrogel to be dried is preferably applied to the belt of the belt dryer by means of a swivel belt. The feed height, i.e., the vertical distance between the swivel belt and the belt of the belt dryer, is preferably not less than 10 cm, more preferably not less than 20 cm and most preferably not less than 30 cm and preferably up to 200 cm, more preferably up to 120 cm and most preferably up to 40 cm.

The thickness on the belt dryer of the hydrogel to be dried is preferably not less than 2 cm, more preferably not less than 5 cm and most preferably not less than 8 cm and preferably not more than 20 cm, more preferably not more than 15 cm and most preferably not more than 12 cm.

The belt speed of the belt dryer is preferably not less than 0.005 m/s, more preferably not less than 0.01 m/s and most preferably not less than 0.015 m/s and preferably up to 0.05 m/s, more preferably up to 0.03 m/s and most preferably up to 0.025 m/s.

Drying by the conveyor belt process (belt drying) wherein apertured trays of a circular conveyor in a tunnel are loaded with dryer feedstock in the manner indicated above and the dryer feedstock is dried during conveyance by blowing gas/air/mixture through the tray apertures in the manner indicated above constitutes the most economical drying process for water-absorbing polymers and therefore is preferred. The rate of drying of the material to be dried is determined by the evaporation rate, which indicates how many kg of water per square meter of belt area per hour are dried out of the product to be dried. This evaporation rate should be as high as possible for economic reasons.

The hydrogel structure which is to be dried by the process of the present invention and which if appropriate has been mixed with additional reactants and/or water-absorbing polymeric particles removed as subsize in the classifying steps has by virtue of its loose arrangement of already divided gel bodies a relatively large gel surface area and hence an economically advantageous drying rate for belt drying. In a particularly preferred version of the process according to the present invention, the drying rate can be further enhanced by applying a release agent to the hydrogel particles. The release agents are applied, without the hydrogel particles being subjected to a mechanical stress, by spraying in suitable apparatus, examples being a rotary tube, a Drais mixer, plowshare mixers, such as Lödige mixers, Peterson-Kelly mixers, cone-screw mixers.

Useful release agents include nonionic, ionic or amphoteric surfactants having an HLB value of not less than 3 (for definition of HLB value: see W. C. Griffin, J. Soc. Cosmetic Chem. 5 (1954) 249). Preference is given to such surfactants which are soluble or at least dispersible in water. The use of surfactants to improve the drying properties of hydrogel particles when drying by means of contact dryers is known and exhaustively described in EP-A-0 785 224. Examples of surfactants acting as release agents are to be found in EP-A-0 785 223 at page 3 line 27 to page 4 line 38. Useful release agents further it include silicones, unsaturated alcohols or polyglycols and derivatives thereof. Examples of the stated classes of compounds are to be found in DE-A-198 46 413 at page 6 lines 21 to 42.

As comparatively large pieces become comminuted to subsequently fine fragments in the course of drying, it is preferable to keep the temperature of the polymer gel in the course of progressive drying as low as possible in order that the efficiency may be enhanced and in order that the sticking together of the pieces or fine fragments may be prevented. This can be accomplished for example by adequate cooling of the resulting polymeric gel with incoming cold air or ambient air, in which case the cold of evaporation will automatically cool down the polymer material. The polymer gel is dried in this way for example by stream drying on a belt.

The process of the present invention makes it possible to dry aqueous polymeric gels such that the Drying Quality Index (DQI) is typically not more than 8, preferably not more than 6, more preferably not more than 4, even more preferably not more than 2 and most preferably not more than 1 and typically not less than 0.01.

The process of the present invention is particularly advantageous when the aqueous polymeric gels are produced using wholly or partly crosslinkers which comprise two or more ethylenically unsaturated groups and wherein two or more ethylenically unsaturated groups are conjoined with each other via one or more ester groups, examples being esters of unsaturated mono- or polycarboxylic acids with polyols, such as diacrylate or triacrylate, examples being butanediol diacrylate, butanediol dimethacrylate, ethylene glycol diacrylate, ethylene glycol dimethacrylate and also trimethylolpropane triacrylate and allyl compounds, such as allyl(meth)acrylate, triallyl cyanurate, diallyl maleate and polyallyl esters.

The aqueous polymeric gels are obtained by polymerization of a monomer solution comprising
a) at least one ethylenically unsaturated acid-functional monomer,
b) at least one crosslinker,
c) if appropriate one or more ethylenically and/or allylically unsaturated monomers copolymerizable with the monomer a), and
d) if appropriate one or more water-soluble polymers onto which the monomers a), b) and if appropriate c) can be at least partly grafted.

Suitable monomers a) are for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred. Acrylic acid is most preferable.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

where $R^1$ is hydrogen or methyl, $R^2$ is hydrogen or methyl, $R^3$ is hydrogen or methyl and $R^4$ is hydrogen or an acyl radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3=$methyl, especially racemic alpha-tocopherol. $R^1$ is more preferably hydrogen or acetyl. RRR-alpha-tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being counted as acrylic acid. For example, the monomer solution can be produced using an acrylic acid having an appropriate hydroquinone half ether content.

The crosslinkers b) are compounds having at least two polymerizable groups which can be free-radically interpolymerized into the polymer network. Suitable crosslinkers b) are for example ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates, as described in EP-A-0 547 847, EP-A-0 559 476, EP-A-0 632 068, WO-A-93/21237, WO-A-03/104299, WO-A-03/104300, WO-A-03/104301 and DE-A-103 31 450, mixed acrylates which, as well as acrylate groups, comprise further ethylenically unsaturated groups, as described in DE-A-103 31 456 and prior German patent application 10355401.7, or crosslinker mixtures as described for example in DE-A-195 43 368, DE-A-196 46 484, WO-A-90/15830 and WO-A-02/32962.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl(meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the invention utilizes di(meth)acrylates of polyethylene glycols, the polyethylene glycol used having a molecular weight between 300 and 1000.

However, particularly advantageous crosslinkers b) are di- and triacrylates of 3- to 15-tuply ethoxylated glycerol, of 3- to 15-tuply ethoxylated trimethylolpropane, of 3- to 15-tuply

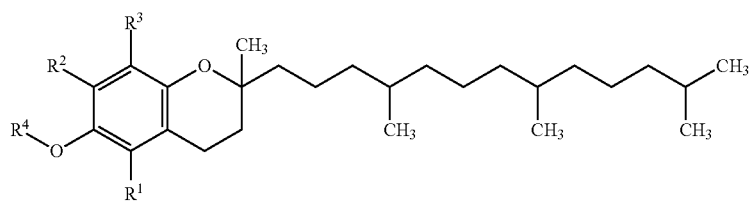

ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of 40-tuply ethoxylated glycerol, of 40-tuply ethoxylated trimethylolethane and also of 40-tuply ethoxylated trimethylolpropane.

Very particularly preferred for use as crosslinkers b) are diacrylated, dimethacrylated, triacrylated or trimethacrylated multiply ethoxylated and or propoxylated glycerols as described for example in WO-A-03/104301. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the water-absorbing polymer and the aqueous extracts of water-absorbing polymers produced therewith have an almost unchanged surface tension (typically not less than 0.068 N/m) compared with water at the same temperature.

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

Polymerization inhibitors, which are preferred, require dissolved oxygen for optimum performance. Therefore, polymerization inhibitors may be freed of dissolved oxygen prior to polymerization by inertization, i.e. flowing an inert gas, preferably nitrogen, through them. The oxygen content of the monomer solution is preferably lowered to less than 1 weight ppm and more preferably to less than 0.5 weight ppm prior to polymerization.

The preparation of a suitable base polymer and also further useful hydrophilic ethylenically unsaturated monomers d) are described in DE-A-199 41 423, EP-A-0 686 650, WO-A-01/45758 and WO-A-03/104300.

Water absorbing polymers are typically obtained by addition polymerization of an aqueous monomer solution with or without subsequent comminution of the hydrogel. Suitable methods of making are described in the literature. Water absorbing polymers are obtainable for example by
- gel polymerization in the batch process or tubular reactor and subsequent comminution in meat grinder, extruder or kneader (EP-A-0 445 619, DE-A-19 846 413)
- addition polymerization in kneader with continuous comminution by contrarotatory stirring shafts for example (WO-A-01/38402)
- addition polymerization on belt and subsequent comminution in meat grinder, extruder or kneader (DE-A-38 25 366, U.S. Pat. No. 6,241,928)
- emulsion polymerization, which produces bead polymers having a relatively narrow gel size distribution (EP-A-0 457 660)
- in situ addition polymerization of a woven fabric layer which, usually in a continuous operation, has previously been sprayed with aqueous monomer solution and subsequently been subjected to a photopolymerization (WO-A-02/94328, WO-A-02/94329).

The reaction is preferably carried out in a kneader as described for example in WO-A-01/38402, or on a belt reactor as described for example in EP-A-0 955 086.

The acid groups of the hydrogels obtained have typically been partially neutralized, preferably to an extent of in the range from 25 to 85 mol %, more preferably to an extent of in the range from 27 to 80 mol % and even more preferably to an extent of in the range from 27 to 30 mol % or 40 to 75 mol %, for which the customary neutralizing agents can be used, preferably alkali metal hydroxides, alkali metal oxides, alkali metal carbonates or alkali metal bicarbonates and also mixtures thereof. Instead of alkali metal salts it is also possible to use ammonium salts. Sodium and potassium are particularly preferred as alkali metals, but most preference is given to sodium hydroxide, sodium carbonate or sodium bicarbonate and also mixtures thereof. Neutralization is customarily achieved by admixing the neutralizing agent as an aqueous solution or else preferably as a solid material. For example, sodium hydroxide having a water content of distinctly below 50% by weight can be present as a waxy mass having a melting point of above 23° C. In this case, metering as piecegoods or melt at elevated temperature is possible.

Neutralization can be carried out after polymerization, at the hydrogel stage. But it is also possible to neutralize up to 40 mol %, preferably from 10 to 30 mol % and more preferably from 15 to 25 mol % of the acid groups before polymerization by adding a portion of the neutralizing agent to the monomer solution and to set the desired final degree of neutralization only after polymerization, at the hydrogel stage. The monomer solution can be neutralized by admixing the neutralizing agent. The hydrogel may be mechanically comminuted, for example by means of a meat grinder, in which case the neutralizing agent can be sprayed, sprinkled or poured on and then carefully mixed in. To this end, the gel mass obtained can be repeatedly rinsed for homogenization. Neutralization of the monomer solution to the final degree of neutralization is preferred.

The aqueous hydrogels obtained are subsequently dried according to the processes of the present invention which are described above.

The rest of the treatment of the dried hydrogel is not important to the process of the present invention. The process of the present invention may further comprise the steps of grinding, sieving and/or postcrosslinking for example.

The dried hydrogel is preferably ground and sieved, useful grinding apparatus typically including roll mills, pin mills or swing mills. The particle size of the sieved, dry hydrogel is preferably below 1000 μm, more preferably below 900 μm and most preferably below 800 μm and preferably above 100 μm, more preferably above 150 μm and most preferably above 200 μm.

Very particular preference is given to a particle size (sieve cut) in the range from 106 to 850 μm. The particle size is determined according to EDANA (European Disposables and Nonwovens Association) recommended test method No. 420.2-02 "Particle size distribution".

The base polymers are then preferably surface postcrosslinked. Useful postcrosslinkers are compounds comprising two or more groups capable of forming covalent bonds with the carboxylate groups of the hydrogel. Suitable compounds are for example alkoxysilyl compounds, polyaziridines, polyamines, polyamidoamines, di- or polyglycidyl compounds, as described in EP-A-0 083 022, EP-A-543 303 and EP-A-937 736, di- or polyfunctional alcohols, as described in DE-C-33 14 019, DE-C-35 23 617 and EP-A-450 922, or β-hydroxyalkylamides, as described in DE-A-102 04 938 and U.S. Pat. No. 6,239,230.

Useful surface postcrosslinkers are further said to include by DE-A-40 20 780 cyclic carbonates, by DE-A-198 07 502 2-oxazolidone and its derivatives, such as 2-hydroxyethyl-2-oxazolidone, by DE-A-198 07 992 bis- and poly-2-oxazolidinones, by DE-A-198 54 573 2-oxotetrahydro-1,3-oxazine and its derivatives, by DE-A-198 54 574 N-acyl-2-oxazolidones, by DE-A-102 04 937 cyclic ureas, by DE-A-103 34 584 bicyclic amide acetals, by EP-A-1 199 327 oxetanes and cyclic ureas and by WO-A-03/031482 morpholine-2,3-dione and its derivatives.

Postcrosslinking is typically carried out by spraying a solution of the surface postcrosslinker onto the hydrogel or onto the dry base-polymeric powder. After spraying, the polymeric powder is thermally dried, and the crosslinking reaction may take place not only before but also during drying.

The spraying with a solution of the crosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige® mixers, Bepex® mixers, Nauta® mixers, Processall® mixers and Schugi® mixers.

Contact dryers are preferable, shovel dryers more preferable and disk dryers most preferable as apparatus in which thermal drying is carried out. Useful dryers include for example Bepex® dryers and Nara® dryers. Fluidized bed dryers can be used as well.

Drying may take place in the mixer itself, by heating the jacket or introducing a stream of warm air. It is similarly possible to use a downstream dryer, for example a tray dryer, a rotary tube oven or a heatable screw. But it is also possible for example to utilize an azeotropic distillation as a drying process.

Preferred drying temperatures are in the range from 50 to 250° C., preferably in the range from 50 to 200° C. and more preferably in the range from 50 to 150° C. The preferred residence time at this temperature in the reaction mixer or dryer is below 30 minutes and more preferably below 10 minutes.

The present invention further provides water-absorbing polymers obtainable by the process described above.

The water-absorbing polymers of the present invention typically have a Centrifuge Retention Capacity (CRC) of not less than 10 g/g, preferably not less than 15 g/g and more preferably not less than 20 g/g and customarily of less than 100 g/g. Centrifuge Retention Capacity (CRC) is determined by EDANA (European Disposables and Nonwovens Association) recommended test method No. 441.2-02 "Centrifuge retention capacity".

The water-absorbing polymers of the present invention typically have an Absorbancy Under Load 0.3 psi (2.07 kPa) of not less than 10 g/g, preferably not less than 15 g/g and more preferably not less than 20 g/g and customarily of less than 60 g/g. Absorbancy Under Load (AUL) is determined by EDANA (European Disposables and Nonwovens Association) recommended test method No. 442.2-02 "Absorption under pressure".

The present invention further provides processes for producing hygiene articles, in particular diapers, comprising the use of water-absorbing polymeric particles produced according to the abovementioned process.

The present invention further provides apparatus for drying water-absorbing polymers, comprising
i) at least one gas-pervious conveyor belt,
ii) at least one conveyor belt i) having apparatus whereby two or more heated gas streams of different temperatures can be supplied to the at least one conveyor belt i),
iii) at least one gas preheater,
iv) at least one gas supply directed downwardly onto the conveyor belt i),
v) if appropriate at least one gas supply directed upwardly onto the conveyor belt i), the conveyor belt i) first being subjected to upwardly directed flow, and
vi) at least one apparatus for pressure reduction.

The apparatus ii) can consist for example of at least two independent gas preheaters or of one gas preheater, in which case the heated gas stream is divided and the temperatures of the divisional streams are adjustable independently of each other by admixing offgas or fresh gas.

The number of gas streams of differing temperature which are suppliable via the apparatus ii) is preferably at least 6, more preferably at least 8, even more preferably at least 10 and most preferably at 12.

Heated shall be understood as meaning that it is possible to supply thermal energy to the gas streams, so that the temperature of the gas stream is higher than prior to heating, preferably at least 10° C. higher, more preferably at least 20° C. higher, even more preferably at least 30° C. higher and most preferably at least 40° C. higher.

Examples of apparatus useful as apparatus vi) are compressors disposed such that gas is conveyed out of the dryer, so that the pressure in the dryer is lower than in the surroundings.

The present invention further provides apparatus for drying water-absorbing polymers, comprising
i) at least one gas-pervious conveyor belt,
ii) at least one conveyor belt i) having apparatus whereby at least ten heated gas streams of different temperatures can be supplied to the at least one conveyor belt i),
iii) at least one gas preheater,
iv) at least one gas supply directed downwardly onto the conveyor belt i),
v) if appropriate at least one gas supply directed upwardly onto the conveyor belt i), the conveyor belt i) first being subjected to upwardly directed flow, and
vi) if appropriate at least one apparatus for pressure reduction.

The number of gas streams of differing temperature which are suppliable via the apparatus ii) is preferably at least 11, more preferably at least 12, even more preferably at least 13 and most preferably at 14.

The process of the present invention provides a simple way to produce water-absorbing polymers which have an outstanding absorptive profile. The process of the present invention provides for gentle and economical drying of the as-polymerized aqueous polymeric gel. Product properties are only minimally affected by the drying of the present invention. The water-absorbing polymers obtained in this way are very widely useful in fields where aqueous fluids are to be absorbed and retained. Preferred fields of use, as well as the hygiene sector, include in particular the agrisector and also further industrial fields of application.

To determine the quality of postcrosslinking, the dried water absorbing polymeric particles are tested using the test methods described hereinbelow.

Methods:

The measurements should unless otherwise stated be carried out at an ambient temperature of 23±2° C. and a relative humidity of 50±10%. The water absorbing polymers are thoroughly mixed through before measurement.

Centrifuge Retention Capacity (CRC)

The centrifuge retention capacity of water absorbing polymeric particles is determined according to EDANA (European Disposables and Nonwovens Association) recommended test method No. 441.2-02 "Centrifuge retention capacity".

Extractables

The level of extractables in the water absorbing polymeric particles is determined according to EDANA (European Disposables and Nonwovens Association) recommended test method No. 470.2-02 "Extractables".

Moisture Content:

Moisture content is determined in accordance with the method described in the monograph "Modern Superabsorbent Polymer Technology", F. L. Buchholz and A. T. Graham, Wiley-VCH, 1998, pages 143 and 144. 1 g of hydrogel sample is dried in an LC column under a helium atmosphere at 180° C. for 1 hour and the moisture content is computed via the weight loss.

Drying Quality Index (DQI)

To determine the Drying Quality Index, a sample is taken of the comminuted aqueous polymeric gel after the polymerization, distributed homogeneously in a thin layer on sieve-bottomed metal sheets and then dried at 80° C. under reduced pressure at less than 100 mbar for 24 h. This form of drying is very gentle. The dried hydrogel is subsequently ground and the sieve fraction from 300 to 600 μm is isolated (polymer 1).

A hydrogel sample dried by the drying process to be tested is likewise ground. The sieve fraction from 300 to 600 μm is subsequently isolated (polymer 2).

The dried water-absorbing polymers are characterized by determining Centrifuge Retention Capacity (CRC) and Extractables. In addition, the moisture content is determined and arithmetically allowed for when computing these properties. The moisture content is typically about 5% by weight.

The measured values are then used to determine the Drying Quality Index (DQI), which computes as follows:

$$DQI=0.5\times(CRC_2\,[g/g]-CRC_1\,[g/g])+0.5\times(\text{Extractables}_2\,[\%]-\text{Extractables}_1\,[\%])$$

The subordinate indices identify the polymers 1 and 2 respectively. The Drying Quality Index increases with increasing Centrifuge Retention Capacity due to plant drying and with increasing Extractables. The two contributions are given equal weight. The magnitude of the Drying Quality Index indicates to what extent the properties of the water-absorbing polymer are affected by the drying conditions of the aqueous polymeric gel. A low Drying Quality Index is indicative of gentle drying.

EDANA test methods are available for example at European Disposables and Nonwovens Association, Avenue Eugène Plasky 157, B-1030 Brussels, Belgium.

EXAMPLES

Production of Polymer Gel

Water, 50% by weight aqueous sodium hydroxide solution and acrylic acid were mixed to produce a 38.8% by weight acrylic acid/sodium acrylate solution such that the degree of neutralization was 71.3 mol %. The solids content of the monomer solution was 38.8% by weight. After mixing the components, the monomer solution was continuously cooled down to a temperature of 29° C. by means of a heat exchanger and devolatilized with nitrogen.

Polyethylene glycol 400 diacrylate (diacrylate of a polyethylene glycol having an average molecular weight of 400 g/mol) is used as multiply ethylenically unsaturated crosslinker. The amount used was 2 kg per metric ton of monomer solution.

The following components are used to initiate free-radical polymerization: hydrogen peroxide (1.03 kg (0.25% by weight) per metric ton of monomer solution), sodium peroxo-disulfate (3.10 kg (15% by weight) per metric ton of monomer solution) and also ascorbic acid (1.05 kg (1% by weight) per metric ton of monomer solution).

The monomer solution throughput was 18 metric tons/h.

The individual components were continuously metered into a List Contikneter continuous kneading reactor having a capacity of 6.3 m$^3$ (from List of Arisdorf in Switzerland) in the following amounts:

18 metric tons/h of monomer solution 36 kg/h of polyethylene glycol 400 diacrylate 74.34 kg/h of hydrogen peroxide solution/sodium peroxo-disulfate solution 18.9 kg/h of ascorbic acid solution At the downstream end of the reactor, 750 to 900 kg/h of removed subsize having a particle size of less than 150 μm were additionally added by metered addition.

The reaction solution had a temperature of 23.5° C. at the point of feed. The reactor was operated at a speed of 38 rpm for the shafts. The residence time of the reaction mixture in the reactor was 15 minutes.

The product gel obtained was analyzed and found to have a residual acrylic acid content of 0.6% by weight (based on solids content) and a solids content of 45.0% by weight. Any gel particles 50 mm or more in diameter were separated off.

Examples 1 to 4

Following polymerization and gel comminution, the aqueous polymeric gel was applied to a belt dryer. Altogether 18.3 metric tons/h of aqueous polymeric gel having a water content of 55% by weight were dried. The gel was applied to the conveyor belt of the dryer by means a swivel belt from a height of 30 cm. The height of the gel layer was about 10 cm.

Dryer belt speed was 0.02 m/s and residence time on the dryer belt was about 37 minutes.

The belt dryer was subdivided into a total of six temperature zones in which the gas inlet temperatures were independently adjustable. The residence time in the temperature zones $T_1$ to $T_6$ was (n=1; a=2; b=3, c=6):

| Temperature zone | Rel. residence time | Abs. residence time |
| --- | --- | --- |
| $T_1$ | 9% | about 3.3 minutes |
| $T_2$ | 9% | about 3.3 minutes |
| $T_3$ | 14% | about 5.2 minutes |
| $T_4$ | 22⅔% | about 8.4 minutes |
| $T_5$ | 22⅔% | about 8.4 minutes |
| $T_6$ | 22⅔% | about 8.4 minutes |

The belt was subjected to an upwardly directed air stream in $T_1$ to $T_3$ temperature zones. Air velocity was 1.2 m/s.

The belt was subjected to a downwardly directed air stream in $T_4$ to $T_6$ temperature zones. Air velocity was 1.8 m/s.

The gas inlet temperatures of the individual temperature zones are summarized in Table 1 and the measured results in Table 2.

TABLE 1

Gas inlet temperatures

| Example | $T_1$ | $T_2$ | $T_3$ | $T_4$ | $T_5$ | $T_6$ |
|---|---|---|---|---|---|---|
| 1 | 175° C. | 175° C. | 175° C. | 175° C. | 175° C. | 175° C. |
| 2 | 180° C. | 180° C. | 175° C. | 175° C. | 175° C. | 175° C. |
| 3 | 180° C. | 180° C. | 165° C. | 175° C. | 175° C. | 175° C. |
| 4 | 180° C. | 175° C. | 165° C. | 175° C. | 170° C. | 165° C. |

TABLE 2

Measured results

| Example | $CRC_1$ | $Extractables_1$ | $CRC_2$ | $Extractables_2$ | DQI |
|---|---|---|---|---|---|
| 1 | 34.1 g/g | 8.5% by weight | 44.9 g/g | 16.7% by weight | 9.5 |
| 2 | 34.0 g/g | 8.4% by weight | 42.1 g/g | 14.4% by weight | 7.05 |
| 3 | 34.6 g/g | 8.1% by weight | 39.0 g/g | 12.8% by weight | 4.55 |
| 4 | 34.3 g/g | 8.2% by weight | 34.9 g/g | 8.5% by weight | 0.45 |

Examples 5 to 7

Following polymerization and gel comminution, the aqueous polymeric gel was applied to a belt dryer. Altogether 18.3 metric tons/h of aqueous polymeric gel having a water content of 55% by weight were dried. The gel was applied to the conveyor belt of the dryer by means a swivel belt from a height of 30 cm. The height of the gel layer was about 10 cm.

Dryer belt speed was 0.02 m/s and residence time on the dryer belt was about 37 minutes.

The belt dryer was subdivided into a total of six temperature zones in which the gas inlet temperatures were independently adjustable. The residence time in the temperature zones $T_1$ to $T_6$ was (n=1; a=2; b=3, c=6):

| Temperature zone | Temperature | Rel. residence time | Abs. residence time |
|---|---|---|---|
| $T_1$ | 180° C. | 9% | about 3.3 minutes |
| $T_2$ | 175° C. | 9% | about 3.3 minutes |
| $T_3$ | 165° C. | 14% | about 5.2 minutes |
| $T_4$ | 175° C. | 22⅔% | about 8.4 minutes |
| $T_5$ | 170° C. | 22⅔% | about 8.4 minutes |
| $T_6$ | 165° C. | 22⅔% | about 8.4 minutes |

The direction of flow against the conveyor belt in each temperature zone was independently selectable either as downward or as upward. The water content at air reversal was adjusted via the residence time. To this end, the number of temperature zones subjected to upward or downward flow was appropriately varied.

Air flow against the belt was upward in the upstream temperature zones. Air velocity was 1.2 m/s.

Air flow against the belt was downward in the downstream temperature zones. Air velocity was 1.8 m/s.

The parameter settings are summarized in Table 3 and the measured results in Table 4.

TABLE 3

Air velocities, relative residence times and water contents at direction of flow reversal

| Example | Relative residence time of hydrogel at flow reversal | Water content of hydrogel at flow reversal |
|---|---|---|
| 5 | 32% | 29.9% by weight |
| 6 | 18% | 36.3% by weight |
| 7 | 54⅓% | 25.8% by weight |

TABLE 4

Measured results

| Example | $CRC_1$ | $Extractables_1$ | $CRC_2$ | $Extractables_2$ | DQI |
|---|---|---|---|---|---|
| 5 | 34.4 g/g | 8.2% by weight | 35.1 g/g | 8.3% by weight | 0.41 |
| 6 | 34.3 g/g | 8.3% by weight | 38.7 g/g | 9.6% by weight | 2.84 |
| 7 | 34.6 g/g | 8.1% by weight | 39.2 g/g | 12.9% by weight | 4.68 |

Examples 8 to 10

Following polymerization and gel comminution, the aqueous polymeric gel was applied to a belt dryer. Altogether 18.3 metric tons/h of aqueous polymeric gel having a water content of 55% by weight were dried. The gel was applied to the conveyor belt of the dryer by means a swivel belt from a height of 30 cm. The height of the gel layer was about 10 cm.

Effective conveyor belt length for drying was 44 m.

The belt dryer was subdivided into a total of six temperature zones in which the gas inlet temperatures were independently adjustable. The residence time in the temperature zones $T_1$ to $T_6$ was (n=1; a=2; b=3, c=6):

| Temperature zone | Temperature | Rel. residence time |
|---|---|---|
| $T_1$ | 180° C. | 9% |
| $T_2$ | 175° C. | 9% |
| $T_3$ | 165° C. | 14% |
| $T_4$ | 175° C. | 22⅔% |
| $T_5$ | 170° C. | 22⅔% |
| $T_6$ | 165° C. | 22⅔% |

The residence time in the belt dryer was adjusted via the belt speed. The gas velocity at which the hydrogel layer lifted off the belt (fluidization point) was 11 m/s.

An air stream was directed upwardly against the belt in the $T_1$ to $T_3$ temperature zones.

An air stream was directed downwardly against the belt in the $T_4$ to $T_6$ temperature zones. The air velocity was 1.8 m/s.

The parameter settings are summarized in Table 5 and the measured results in Table 6.

TABLE 5

Air velocities, relative residence times and water contents at direction of flow reversal

| Example | Air velocity before flow reversal | Relative air velocity before flow reversal (based on $v_{max}$) | Residence time in dryer |
|---|---|---|---|
| 8 | 0.8 m/s | 7% | 50 minutes |
| 9 | 1.2 m/s | 11% | 30 minutes |
| 10 | 3.2 m/s | 29% | 40 minutes |

TABLE 6

| Examples | Measured results Water content after drying | DQI |
|---|---|---|
| 8 | 7% by weight | 8.10 |
| 9 | 4% by weight | 0.45 |
| 10*) | 5% by weight | 2.70 |

*)Cracking in gel layer

We claim:

1. Apparatus for drying a water-absorbing polymer, comprising
   i) at least one gas-pervious conveyor belt,
   ii) at least one conveyor belt i) having apparatus whereby two or more gas streams of different temperatures can be supplied to the at least one conveyor belt i),
   iii) at least one gas preheater,
   iv) at least one gas supply directed downwardly onto the conveyor belt i),
   v) optionally at least one gas supply directed upwardly onto the conveyor belt i), the conveyor belt i) first being subjected to upwardly directed flow, and
   vi) at least one apparatus for pressure reduction.

2. Apparatus for drying a water-absorbing polymer, comprising
   i) at least one gas-pervious conveyor belt,
   ii) at least one conveyor belt i) having apparatus whereby ten or more gas streams of different temperatures can be supplied to the at least one conveyor belt i),
   iii) at least one gas preheater,
   iv at least one gas supply directed downwardly onto the conveyor belt i),
   v optionally at least one gas supply directed upwardly onto the conveyor belt i), the conveyor belt i) first being subjected to upwardly directed flow, and
   vi optionally at least one apparatus for pressure reduction.

3. The apparatus according to claim 1 wherein the conveyor belt can be flowed against upwardly in the upstream sector and downwardly in the down-stream sector.

4. A method of drying a water-absorbing polymer comprising applying a polymer gel to an apparatus of claim 1.

5. The apparatus according to claim 2 wherein the conveyor belt can be flowed against upwardly in the upstream sector and downwardly in the down-stream sector.

6. A method of drying a water-absorbing polymer comprising applying a polymer gel to an apparatus of claim 2.

* * * * *